United States Patent [19]

Seyerle

[11] 4,328,659
[45] May 11, 1982

[54] RIDING MOWER INCLUDING BELT DRIVE SYSTEM

[75] Inventor: Carl E. Seyerle, Abingdon, Ill.

[73] Assignee: Outboard Marine Corporation, Waukegan, Ill.

[21] Appl. No.: 157,470

[22] Filed: Jun. 9, 1980

[51] Int. Cl.³ ............................................ A01D 69/08
[52] U.S. Cl. .................................... 56/11.8; 56/11.6; 56/11.2
[58] Field of Search ..................... 56/11.8, 11.2, 11.6; 474/117, 135, 138, 101, 109, 148

[56] References Cited

U.S. PATENT DOCUMENTS

| | | | |
|---|---|---|---|
| 2,957,534 | 10/1960 | Burdett | 56/11.8 |
| 3,365,968 | 1/1968 | Merriman | 474/138 |
| 3,460,325 | 8/1969 | Musgrave | 56/11.8 |
| 3,702,570 | 11/1972 | Stikkers | 474/117 |
| 3,977,266 | 8/1976 | Tantlinger | 474/135 |
| 4,094,205 | 6/1978 | Cook | 474/109 |

Primary Examiner—Robert A. Hafer
Attorney, Agent, or Firm—Michael, Best & Friedrich

[57] ABSTRACT

The drive system includes a drive pulley operably connected to a prime mover for selective rotation in opposite directions, a driven pulley, an endless belt trained about the drive and driven pulleys, an arm having a first end rotatably supporting the driven pulley and a second end mounted for pivotal movement of the arm and the driven pulley, a drive wheel, such as a sprocket, mounted on the first end of the arm for common rotation with the driven pulley, a rotatably mounted driven wheel, such as a sprocket, and an endless flexible member, such as a chain, trained about the drive and driven wheels for rotating the driven wheel in response to rotation of the drive pulley, whereby the resultant force applied on the drive wheel by the flexible drive member, when the drive pulley is rotated in either direction, is in a direction tending to pivot the arm and the driven pulley about the arm pivot axis in a direction for applying tension on the slack side of the belt.

14 Claims, 3 Drawing Figures

U.S. Patent  May 11, 1982  4,328,659
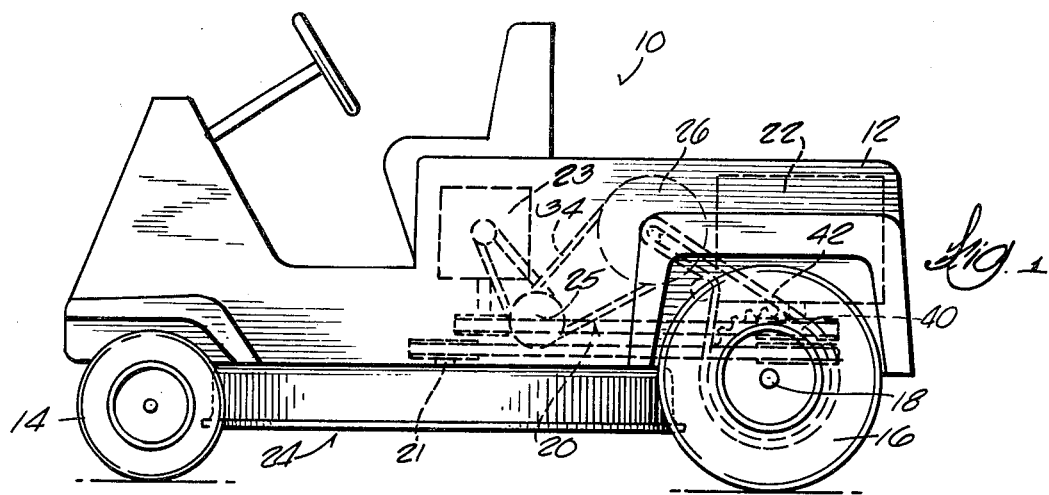
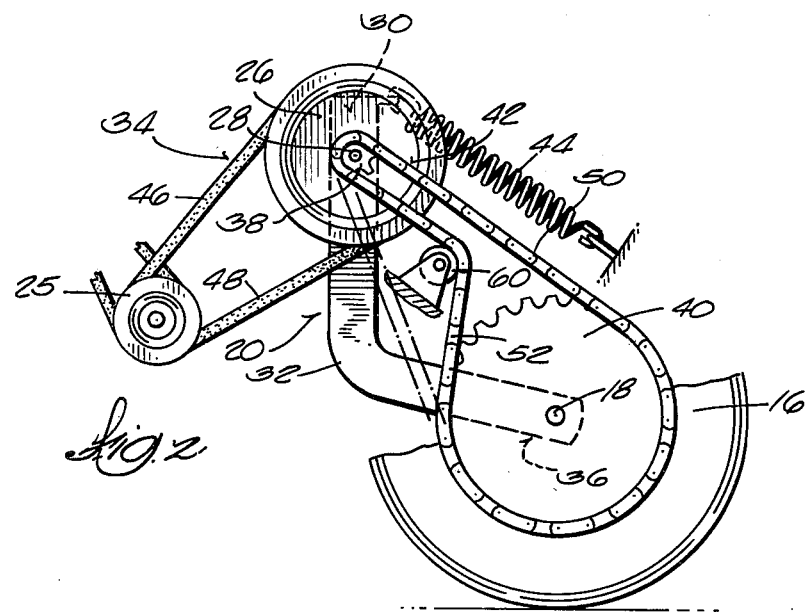
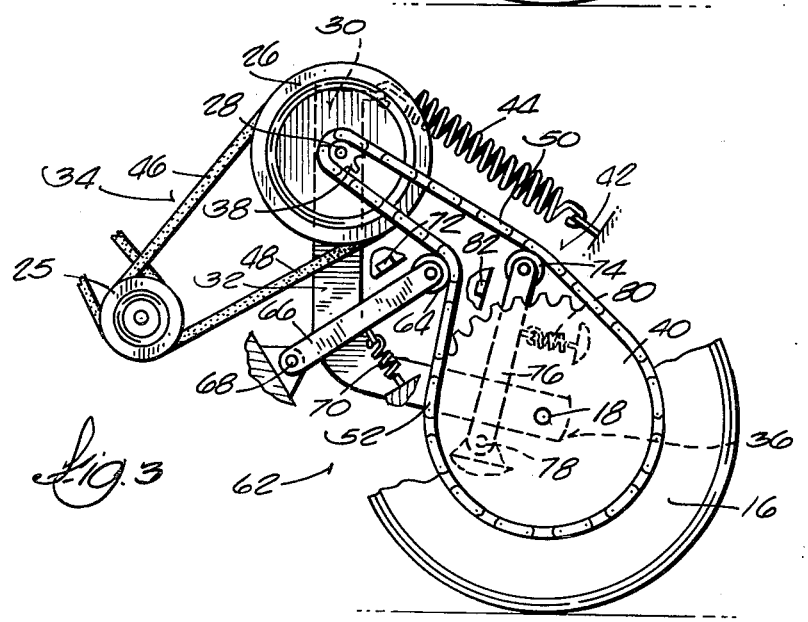

RIDING MOWER INCLUDING BELT DRIVE SYSTEM

BACKGROUND OF THE INVENTION

This invention relates to belt drive systems and, more particularly, to riding mowers including a belt drive system.

The drive wheels for self-propelled, riding lawn mowers commonly are driven by a belt drive system including an endless belt trained about a drive pulley and a driven pulley. During operation, one run or side of the belt, referred to as the tight side, is under both dynamic and static tension whereas the other or slack side is under only static tension. If the ratio of dynamic to static tension becomes too great, the belt slips and the drive system becomes inefffective. This condition can be minimized by providing means for automatically increasing the static tension on the belt to the point where slippage does not occur.

A drive system including means for automatically increasing the static tension as the dynamic tension increases is referred to as being self-energizing. Prior self-energizing belt drive systems are self-energizing only in the forward drive mode and not in the reverse drive mode.

Attention is directed to the following U.S. patents relating to belt drive systems:

| PATENTEE | PATENT NO. | ISSUE DATE |
| --- | --- | --- |
| Henry | 500,069 | June 20, 1893 |
| Hill | 2,795,254 | June 11, 1957 |
| Halls | 3,550,463 | Dec. 29, 1970 |

SUMMARY OF THE INVENTION

The invention provides a riding lawn mower including a frame, an axle mounted on the frame and carrying ground-engaging wheels supporting the frame for travel over the ground, a prime mover supported on the frame, a drive pulley, means drivingly connecting the drive pulley with the prime mover for selective rotation of the drive pulley in forward drive and reverse drive directions, a driven pulley, and an endless belt trained about the drive and driven pulleys for rotating the driven pulley in response to rotation of the drive pulley. The belt has a first side which is under static and dynamic tension and a second side which is under static tension when the drive pulley is rotated in one direction, the second side being under static and dynamic tension and the first side being under static tension when the drive pulley is rotated in the opposite direction. The mower further includes a drive wheel, such as a pulley or sproket, means mounting the driven pulley and the drive wheel for common rotation about a first axis and for movement relative to the drive pulley, a driven wheel, such as a pulley or a sproket, mounted on one of the axle and the ground-engaging wheels for rotating at least one of the ground-engaging wheels, an endless, flexible drive member, such as a belt or chain, and means for training the flexible drive member about the drive and driven wheels for rotating the driven wheel in response to rotation of the drive pulley such that the resultant force applied on the driven pulley by the flexible drive member, when the pulley is driven either direction, is in a direction tending to move the driven pulley relative to the drive pulley in a direction to increase the static tension on the first and second sides of the belt.

In one embodiment, the mounting means for the driven pulley and the drive wheel includes an arm having one end supporting the driven pulley and the drive wheel for rotation about the first axis and a second end mounted for pivotal movement of the arm, the driven pulley and the drive wheel. The resultant force applied on the drive wheel by the flexible drive member tends to pivot the arm in a tensioning direction.

In one embodiment, the travel path of one strand or side of the flexible drive member is such that, when the drive pulley is rotated in a forward drive direction, the resultant force applied on the drive wheel by the flexible drive member tends to pivot the arm in a tensioning direction and the undiverted travel path of the other or second strand or side of the flexible drive member is such that, when the drive pulley is rotated in a reverse drive direction, the resultant force applied on the drive wheel by the flexible drive member would not pivot the arm in a tensioning direction. Means are provided for engaging the second side of the flexible drive member and diverting its travel path so that, when the drive pulley is rotated in the reverse drive direction, the resultant force applied on the drive wheel tends to pivot the arm in a tensioning direction.

In another embodiment, the engagement means includes a first idler wheel resiliently urged into engagement with the second side of the flexible drive member and the means for training the flexible drive member about the drive and driven wheels includes a second idler wheel resiliently urged into engagement with the first side of the flexible drive member to remove the slack therefrom when the drive wheel is rotated in the second direction.

The invention also provides a drive system including a drive pulley, means for rotating the drive pulley in opposite directions, a driven pulley, and an endless belt trained about the drive and driven pulleys for rotating the driven pulley in response to rotation of the drive pulley. The drive system further includes a drive wheel, such as a pulley or a sprocket, means mounting the driven pulley and the drive wheel for common rotation about a first axis and for movement relative to the drive pulley, a driven wheel, such as a pulley or a sproket, mounted for rotation about a second axis spaced from the first axis, and means for training the flexible drive member about the drive and driven wheels so that the resultant force applied on the drive wheel, when the drive pulley is rotated in either direction, is in a direction tending to move the driven pulley relative to the drive pulley in a tensioning direction to increase the static tension on the belt.

One of the principal features of the invention is the provision of a riding lawn mower including a belt drive system which is self-energizing in both forward and reverse drive modes.

Another of the principal features of the invention is the provision of the belt drive system which is self-energizing in both the forward and reverse modes of operation.

A further of the principal features of the invention is the provision of a self-energizing belt drive system including means for applying secondary tension on the driven pulley.

A still further of the principal features of the invention is a provision of a belt drive system described in the preceeding paragraph wherein the driven pulley is rotatably supported on a pivotally mounted arm which rotatably supports a secondary drive wheel driven by the driven pulley and which is pivoted, in response to a resultant force applied on the secondary drive wheel, to apply tension on the slack side of the belt.

Other features, aspects and advantages of the invention will become apparent to those skilled in the art upon reviewing the following detailed description and the appended claims.

BRIEF DESCRIPTION OF THE DRAWING

FIG. 1 is a partially schematic, side elevation view of a riding lawn mower incorporating various of the features of the invention.

FIG. 2 is an enlarged, partially schematic side elevation view of the belt drive system included in the lawn mower shown in FIG. 1.

FIG. 3 is a view similar to FIG. 2 illustrating an alternate construction of the belt drive system.

Before explaining at least one embodiment of the invention in detail, it is to be understood that the invention is not limited in its applications to the details of the construction and arrangement of part set forth in the following general description or illustrated in the accompanying drawings, since the invention is capable of other embodiments of being practiced or carried out in various ways. Also, it is to be understood that the phraseology or terminology employed herein is for the purpose of description and not of limitation.

GENERAL DESCRIPTION

Illustrated in the drawing is a riding lawn mower 10 including a frame 12 which is supported by front and rear ground-engaging wheels 14 and 16 for travel over the ground. The rear wheels 16 are rotatably mounted on a fixed axle 18 for common support. The wheels 16 are driven by a belt drive system 20 operatably connected to a prime mover 22, such as an internal combustion engine or an electric motor, via a conventional reversible transmission 23 (schematically shown) which can be selectively shifted between neutral, forward drive and reverse drive positions. If desired, the wheels 16 could be mounted on the axle 18 for common rotation and the axle could be rotatably mounted on the frame 12 and drivingly connected to the belt drive system 20.

The mower 10 also includes a blade housing 24 rotatably supporting a drive shaft 21 carrying a cutter blade (not shown) located inside the blade housing 24. The drive shaft 21 is drivingly connected to the prime mover 22.

Referring to FIG. 2, the belt drive system 20 includes a rotatably mounted drive pulley 25 drivingly connected to the prime mover 22 via the transmission 23 for selective rotation in opposite directions, a driven pulley 26 mounted on a jackshaft 28 journaled in the upper end 30 of an L-shaped arm 32, and an endless belt 34 trained around the drive pulley 25 and the driven pulley 26. The lower end 36 of the arm 32 is mounted on the axle 18 for pivotal movement of the arm 32 about the axis of the axle 18 as described in more detail below.

The belt driven system 20 also includes a drive wheel, such as a pulley or a sprocket 38, mounted on the jackshaft 28 for common rotation with the driven pulley 26, a driven wheel, such as a pulley or a sprocket 40, mounted on the wheel 16 for common rotation therewith to drive the rear wheels 16, and an endless flexible drive member, such a belt or chain 42, trained about the drive sprocket 38 and the driven sprocket 40.

Sufficient static tension is applied on the belt 34 to prevent slippage during initial operation by a spring 44 which, at one end, is anchored to the frame 12 and, at the other end, is connected to the upper end 30 of the arm 32 so as to bias the arm 32, and thus the driven pulley 26, in a clockwise direction relative to the axle 18 as viewed in FIG. 2.

When the transmission 23 is in the forward drive mode, the drive pulley 25 is rotated in a counterclockwise direction as viewed in FIG. 2, the first or upper strand or side 46 of the belt 34 is under static and dynamic tension and the second or lower strand or side 48 is under static tension and ordinarily is somewhat slack. The drive sprocket 38 is rotated in a counterclockwise direction, the first or upper strand or side 50 of the chain 42 is under tension, and the second or lower strand or lower side 52 of the chain 42 is slack.

Because of the relative locations of the rotational axes of the axle 18 and the jackshaft 28 and the direction of the travel of the upper side 50 of the chain 42 between the driven sprocket 40 and the drive sprocket 38, the resultant of the dynamic loads applied on the rotational axis of the jackshaft 28 by the chain 42 is in a direction tending to pivot the arm 32, and thus the driven pulley 26, in a clockwise direction. This movement of the driven pulley 26 relative to the drive pulley 25 causes an increase in the static tension on the belt 34, thereby removing slack in the lower side 48 of the belt 34 and preventing slippage of the belt 34.

As the torque on the driven sprocket 40 increases, such as when the mower 10 is traveling up a hill, the dynamic load applied on the arm 32 by the chain 42 increases, thereby increasing the static tension applied on the belt 34 to prevent slippage.

When the transmission 23 is in the reverse drive mode, the drive pulley 25 is rotated in a clockwise direction as viewed in FIG. 2, the lower side 48 of the belt 34 is under static and dynamic tension and the upper side 46 is under static tension and is slack. The drive sprocket 38 is rotated in the clockwise direction, the lower side 52 of the chain 42 is in tension and the upper side 50 of the chain 42 is slack. If the lower side 52 of the chain 42 were allowed to take an undiverted travel path from the drive sprocket 38 to the driven sprocket 40 as illustrated by the dashed lines in FIG. 2, the resultant force applied on the rotational axis of the jackshaft 28 would tend to rotate the arm 32 in a counterclockwise direction which would release the static tension on and unload the belt 34.

This condition is obviated by providing an idler wheel 60 which engages the lower side 52 of the chain 42 between the drive sprocket 38 and the driven sprocket 40 and diverts the travel path so that the resultant dynamic force applied on the rotational axis of the jackshaft 28 by the chain 42 is in a direction tending to pivot the arm 32 in a clockwise direction to prevent belt slippage as described above. The idler wheel 60 does not affect the direction of the dynamic force applied on the jackshaft 28 by the chain 42 when the drive system is operating in the forward drive mode.

The static tension applied on the belt 34 increases as the torque on the driven sprocket 40 increases in the same manner described above. Thus, the belt drive system 20 is self-energizing in both the forwad drive and the reverse drive modes.

The same effect can be obtained by locating the jackshaft 28 relative to the axle 18 so that the undiverted travel path of the lower side 52 of the chain 42 is similar to that between the drive sprocket 38 and the idler wheel 60.

In the alternate embodiment illustrated in FIG. 3, components of the belt drive system 62 common with those in the belt drive system 20 illustrated in FIG. 2 are assigned the same reference numerals. The belt drive system 62 includes a first idler wheel 64 rotatably carried on an arm 66 which is pivotally mounted at 68 on the frame 12. The idler wheel 64 is resiliently urged into engagement with the lower side 52 of the chain 40 to provide the desired travel path and to remove slack therefrom, when the belt drive system 62 is operating in the forward drive mode. In the specific construction illustrated, this is accomplished by a tension spring 70 anchored at one end to the frame 12 and connected at the other end to the arm 66. The spring 70 biases the arm 66 in the clockwise direction as viewed in FIG. 3. A stop 72 on the frame 12 limits pivotal movement of the arm 66, and thus the idler wheel 64, in the counterclockwise direction against the biasing force of the spring 70 when the belt drive system 62 is operating in the reverse drive mode. This prevents the lower side 52 of the chain 40 from becoming unloaded.

The belt drive system 62 also includes a second idler wheel 74 rotatably carried on an arm 76 which is pivotally mounted at 78 on the frame 12. The idler wheel 74 is resiliently urged into engagement with the underside of the upper side 50 of the chain 42 to remove slack therefrom when the belt drive system 62 is operating in the reverse drive mode. In the specific construction illustrated, this is accomplished by a tension spring 80 anchored at one end to the frame 12 and connected at the other end to the arm 76. The tension spring 80 biases the arm 76 in the clockwise direction as viewed in FIG. 3. A stop 82 on the frame 12 limits pivotal movement of the arm 76, and thus the idler wheel 74, in the counterclockwise direction against the biasing force of the spring 80 when the belt drive system 62 is operating in the forward drive mode. This prevents the upper side 50 of the chain 42 from becoming unloaded. The construction illustrated in FIG. 3 operates in substantially the same manner as the construction illustrated in FIG. 2 because the idler wheel associated with the side of the chain 42 under tension continues to remain loaded by virtue of the mechanical stop.

Various of the features of the invention are set forth in the following claims.

I claim:

1. A riding lawn mower comprising a frame carrying a cutter blade, an axle mounted on said frame and carrying ground-engaging wheels supporting said frame for travel over the ground, a prime mover supported on said frame, a drive pulley, means drivingly connecting said drive pulley with said prime mover for selective rotation of said drive pulley in forward drive and reverse drive directions, a driven pulley, an endless belt trained about said drive and driven pulleys for rotating said driven pulley in response to rotation of said drive pulley, said belt having a first side which is under dynamic and static tension and a second side which is under static tension when said drive pulley is rotated in one direction, said second side being under static and dynamic tension and said first side being under static tension when said drive pulley is rotated in the opposite direction, a drive wheel, means mounting said driven pulley and said drive wheel for common rotation about a first axis and for movement of said first axis relative to said drive pulley, a driven wheel mounted on one of said axle and said ground-engaging wheel for rotating said ground-engaging wheel in response to rotation of said driven wheel, an endless, flexible drive member, and means for training said flexible drive member about said drive and driven wheels for rotating said driven wheel in response to rotation of said drive pulley so that the resultant force applied on said drive wheel by said flexible drive member, when said drive pulley is rotated in either direction, is in a direction tending to move said drive pulley relative to the drive pulley in a tensioning direction to increase the static tension on said first and second sides of said belt.

2. A riding lawn mower according to claim 1 wherein said mounting means for said driven pulley and said drive wheel includes an arm having a first end supporting said driven pulley and said drive wheel for rotation about said first axis and a second end mounted for pivotal movement of said arm, said driven pulley and said drive wheel about the rotational axis of said axle and wherein the resultant force applied on said drive wheel by said flexible drive member tends to pivot said arm about the rotational axis of said axle in a tensioning direction.

3. A riding lawn mower according to claim 1 wherein said flexible drive member has first and second sides with respect to travel between said drive wheel and said driven wheel, wherein the travel path of the first side of said flexible drive member is such that, when said drive pulley is rotated in a forward drive direction, the resultant force applied on said drive wheel by said flexible drive member tends to move said driven pulley in a tensioning direction, wherein the undiverted travel path of the second side of said flexible drive member is such that, when said drive pulley is rotated in the reverse drive direction, the resultant force applied on said drive wheel by said drive member would not move said driven pulley in a tensioning direction, and wherein said means for training said flexible drive member about said drive and driven wheels includes means for engaging the second side of said flexible drive member and diverting its travel path such that, when said drive pulley is rotated in the reverse drive direction, the resultant force applied on said drive wheel by said flexible drive member tends to move said driven pulley in a tensioning direction.

4. A riding lawn mower according to claim 3 wherein said engaging means comprises an idler wheel.

5. A riding lawn mower according to claim 3 wherein said mounting means for said driven pulley and said drive wheel includes an arm having a first end supporting said driven pulley and said drive wheel for rotation about said first axis and a second end mounted on said axle for pivotal movement about the axis of said axle and wherein the resultant force applied on said drive wheel by said flexible drive member tends to pivot said arm about the axis of said axle in a tensioning direction.

6. A riding lawn mower according to claim 5 wherein said engaging means comprises a first idler wheel and means for resiliently urging said first idler wheel into engagement with the second side of said flexible drive member and wherein said means for training said flexible drive member about said drive and driven wheel includes a second idler wheel and means for resiliently urging said second idler wheel into engagement with the first side of said flexible drive member to remove the slack therefrom when said drive pulley is rotated in the reverse drive direction.

7. A riding lawn mower according to claim 1 wherein said drive and driven wheels are sprockets and wherein said flexible drive member is a chain drivingly engaging said sprockets.

8. A drive system comprising a drive pulley, means for selectively rotating said drive pulley in opposite directions, a driven pulley, an endless belt trained about said drive and driven pulleys for rotating said driven pulley in response to rotation of said drive pulley, said belt having a first side which is under static and dynamic tension and second side which is under static tension when said drive pulley is rotated in one direction, said second side being under static and dynamic tension and said first side being under static tension when said drive pulley is rotated in the opposite direction, a drive wheel, means mounting said driven pulley and said drive wheel for common rotation about a first axis and for movement of said first axis relative to said drive pulley, a driven wheel mounted for rotation about a second axis spaced from said first axis, an endless flexible drive member, and means for training said flexible drive member about said drive and driven wheels for rotating said driven wheel in response to rotation of said drive pulley so that the resultant force applied on said drive wheel by said flexible drive member, when said drive pulley is rotated in either direction, is in a direction tending to move said driven pulley relative to said drive pulley in a tensioning direction to increase the static tension on said first and second sides of said belt.

9. A drive system according to claim 8 wherein said mounting means for said driven pulley and said driven wheel includes an arm having a first end supporting said driven pulley and said drive wheel for rotation about said first axis and a second end mounted for pivotal movement of said arm, said driven pulley and said drive wheel about said second axis and wherein the resultant force applied on said drive wheel by said flexible drive member tends to pivot said arm about said second axis in a tensioning direction.

10. A drive system according to claim 8 wherein said flexible drive member has first and second sides with respect to travel between said drive wheel and said driven wheel, wherein the travel path of the first side of said flexible drive member is such that, when said drive pulley is rotated in a first direction, the resultant force applied on said drive wheel by said flexible drive member tends to move said driven pulley in a tensioning direction, wherein the undiverted travel path of the second side of said flexible drive member is such that, when said drive pulley is rotated in a second direction opposite to the first direction, the resultant force applied on said drive wheel by said flexible drive member would not move said driven pulley in a tensioning direction, and wherein said means for training said flexible drive member about said drive and driven wheels includes means for engaging the second side of said drive member and diverting its travel path such that, when said drive pulley is rotated in the second direction, the resultant force applied on said drive wheel by said flexible drive member tends to move said driven pulley in a tensioning direction.

11. A drive system according to claim 10 wherein said engaging means comprises an idler wheel.

12. A drive system according to claim 10 wherein said engaging means comprises a first idler wheel and means for resiliently urging first idler wheel into engagement with the second side of said flexible drive member and wherein said means for training said flexible drive member about said drive and driven wheels includes a second idler wheel and means for resiliently urging said second idler wheel into engagement with the first side of said drive flexible drive member to remove the slack therefrom when said drive pulley is rotated in the second direction.

13. A drive system according to claim 12 wherein said mounting means for said driven pulley and said drive wheel includes an arm having a first end supporting said driven pulley and said drive wheel for rotation about said first axis and a second end mounted for pivotal movement of said arm, said driven pulley and said drive wheel about said second axis and wherein the resultant force applied on said driven pulley by said flexible drive member tends to pivot said arm about said second axis in a tensioning direction.

14. A drive system according to claim 8 wherein said drive and driven wheels are sprockets and wherein said flexible drive member is a chain drivingly engaging said sprocket.

* * * * *